(12) United States Patent
Laurence et al.

(10) Patent No.: US 7,081,300 B2
(45) Date of Patent: *Jul. 25, 2006

(54) DECORATIVE LAMINATE ASSEMBLY AND METHOD OF PRODUCING SAME

(75) Inventors: Kenneth John Laurence, Hamilton, OH (US); Terry Paul Drees, Crescent Springs, KY (US); Kevin Francis O'Brien, Cincinnati, OH (US); Bob Fairbanks, Cincinnati, OH (US)

(73) Assignee: Formica Corporation, Warren, NJ (US)

( * ) Notice: Subject to any disclaimer, the term of this patent is extended or adjusted under 35 U.S.C. 154(b) by 41 days.

This patent is subject to a terminal disclaimer.

(21) Appl. No.: 09/955,822

(22) Filed: Sep. 18, 2001

(65) Prior Publication Data

US 2002/0160680 A1 Oct. 31, 2002

Related U.S. Application Data

(63) Continuation-in-part of application No. 09/767,556, filed on Jan. 22, 2001, now Pat. No. 6,803,110.

(51) Int. Cl.
*B32B 27/00* (2006.01)
*B32B 27/40* (2006.01)
*B32B 27/36* (2006.01)
*B32B 29/02* (2006.01)
*D06N 7/04* (2006.01)

(52) U.S. Cl. ............... 428/423.7; 428/425.1; 428/147; 428/165; 428/913.3; 442/394; 442/395; 442/412; 442/417

(58) Field of Classification Search ............... 428/147, 428/411.1, 339, 323, 518, 423.7, 219, 165, 428/210, 211, 913.3; 442/287–295, 300, 442/395, 398, 389, 171, 412, 417, 386, 394
See application file for complete search history.

(56) References Cited

U.S. PATENT DOCUMENTS

| 3,798,111 A | 3/1974 | Lane et al. |
| 3,936,341 A | 2/1976 | Nanoux |
| 4,255,480 A | 3/1981 | Scher et al. |

(Continued)

FOREIGN PATENT DOCUMENTS

DE 3839335 A1 6/1989

(Continued)

OTHER PUBLICATIONS

International Search Report dated Jan. 2, 2002 (3 pages).

*Primary Examiner*—Terrel Morris
*Assistant Examiner*—Lynda Salvatore
(74) *Attorney, Agent, or Firm*—Douglas M. Eveleigh; Mayer, Brown, Rowe and Maw LLP

(57) ABSTRACT

A decorative laminate assembly having a decorative laminate top layer assembly. This top layer assembly includes, in descending superimposed relationship, a decorative layer and a core layer that includes PETG, or other polymeric material. Preferably, the top layer assembly also includes a wear resistant overlay layer on top of the decorative layer, and the core layer's PETG is in a sheet form. The top layer assembly may be directly bonded to a water resistant substrate. The decorative laminate assembly of the present invention can be used for a variety of purposes, including flooring applications. When the present invention is used for flooring applications, it is preferred that the overlay layer has enhanced wear resistant qualities and that the water resistant substrate comprise PVC or cement fiberboard.

44 Claims, 2 Drawing Sheets

U.S. PATENT DOCUMENTS

| | | |
|---|---|---|
| 4,443,507 A | 4/1984 | Yamada et al. |
| 4,517,235 A | 5/1985 | Ungar et al. |
| 4,520,062 A | 5/1985 | Ungar et al. |
| RE32,152 E | 5/1986 | Scher et al. |
| 4,713,138 A | 12/1987 | Ungar et al. |
| 4,816,314 A | 3/1989 | Prawdzik et al. |
| 4,855,165 A | 8/1989 | Bolgiano et al. |
| 4,931,324 A | 6/1990 | Ellison et al. |
| 4,963,214 A | 10/1990 | Iwata et al. |
| 5,037,694 A | 8/1991 | Ungar et al. |
| 5,141,799 A | 8/1992 | Mehta et al. |
| 5,425,986 A * | 6/1995 | Guyette ............... 428/141 |
| 5,643,666 A * | 7/1997 | Eckart et al. ........... 428/339 |
| 5,780,147 A | 7/1998 | Sugahara et al. |
| 6,093,473 A * | 7/2000 | Min ..................... 428/147 |
| 6,096,410 A | 8/2000 | Okajima et al. |
| 6,159,331 A | 12/2000 | Chou |

FOREIGN PATENT DOCUMENTS

| | | |
|---|---|---|
| DE | 19610079 A1 | 9/1996 |
| EP | 0186257 A2 | 7/1986 |
| EP | 0477203 B1 | 4/1992 |
| EP | 0561086 A1 | 9/1993 |
| EP | 695629 | 2/1996 |
| EP | 0 783 962 | 4/2003 |
| JP | 3286856 | 12/1991 |
| JP | 4101846 | 4/1992 |
| JP | 9300553 | 11/1997 |
| JP | 10000747 | 1/1998 |
| JP | 2000233480 | 8/2000 |
| JP | 2000325565 | 11/2000 |

* cited by examiner

DECORATIVE LAMINATE ASSEMBLY AND METHOD OF PRODUCING SAME

This is a continuation-in-part of application Ser. No. 09/767,556, filed on Jan. 22, 2001 now U.S. Pat. No. 6,803,110.

FIELD OF THE INVENTION

The present invention relates generally to decorative laminate assemblies and methods for producing the same, and more specifically, decorative laminate assemblies with enhanced moisture resistance and dimensional stability, which qualities are particularly useful in flooring applications where there will be repeated or prolonged exposure to moisture or water.

BACKGROUND OF THE INVENTION

Decorative laminates have been used as a surfacing material for many years, in both commercial and residential applications, where pleasing aesthetic effects in conjunction with desired functional behavior (such as superior wear, heat and stain resistance, cleanability and cost) are preferred. Typical applications have historically included, while not limited to, furniture, kitchen countertops, table tops, store fixtures, bathroom vanity tops, cabinets, wall paneling, office partitions, and the like.

More recently, the applications for decorative laminates have been expanded to include their use as a flooring material in lieu of more expensive real wood, stone or ceramic tile, less sanitary and rugged carpeting, as well as less aesthetically attractive vinyl tile or linoleum-like products. However, as discussed in more detail below, existing decorative laminates are not particularly suited in applications where there is repeated or prolonged exposure to moisture and/or water due to their intrinsic hydrophilic properties. Such existing laminates have therefore been primarily limited to residential applications having dry conditions. Accordingly, as discussed further below, there is a need for a decorative laminate that can be used where there is repeated or prolonged exposure to moisture and/or water, thereby overcoming the deficiencies present in existing decorative laminates.

In general, decorative laminates can be classified into two broad categories, namely high pressure decorative laminates (HPDL) and low pressure decorative laminates (LPDL). As defined by the industry's governing body, the National Electrical Manufacturers Association (NEMA) in their Standards Publication LD 3-1995, high pressure decorative laminates are manufactured or "laminated" under heat and a specific pressure of more than 750 psig. Conversely, low pressure decorative laminates are typically manufactured at about 300 to 600 psig specific pressure to avoid excessive crushing of their substrate material. The other broad distinction between high pressure and low pressure decorative laminates is that the former are generally relatively thin, typically comprising a decorative surface and a phenolic resin impregnated kraft paper core, and are not self supporting as manufactured. As such they are normally bonded, with a suitable adhesive or glue, to a rigid substrate such as a particleboard or medium density fiberboard (MDF), as a separate step during final fabrication of the end product. Conversely, low pressure decorative laminates are typically comprised of a similar type of decorative surface, without the supporting core layer, which is bonded to a substrate such as particleboard or MDF in a single laminating or "pressing" operation during its manufacture.

Both high pressure and low pressure decorative laminates have historically been manufactured in heated, flat-bed hydraulic presses. With the exception of some newer types of processing equipment, high pressure laminates are typically pressed as multiple sheets in press "packs" or "books" in a multi-opening press (which is usually steam or high pressure hot water heated, and water cooled), with a 30 to 60 minute thermal cycle and 130° C. to 150° C. top temperature. On the other hand, low pressure decorative laminates are typically pressed as a single sheet or "board" in a single opening press (which is usually thermoil or electrically heated) using an isothermal, hot discharge "short cycle" of 20 to 60 seconds with press heating platen temperatures of 170° C. to 220° C. Continuous laminating or "double belt" presses for decorative laminate manufacture blur the above distinctions somewhat, in that their "cycle" times and temperatures are similar to those employed for low pressure decorative laminates. In such a process, pressures are intermediate, typically in the range of 300 to 800 psig, while the continuous laminates themselves are relatively thin, without direct bonding to a substrate material and thus requiring a second fabrication step to do so as is the case with conventional high pressure decorative laminates. The process and product dissimilarities delineated above, as well as more subtle process differences, will be appreciated by those versed in the art.

High pressure decorative laminates are generally comprised of a decorative sheet layer, which is either a solid color or a printed pattern, over which is optionally placed a translucent overlay sheet, typically employed in conjunction with a print sheet to protect the print's ink line and enhance abrasion resistance, although an overlay can be used to improve the abrasion resistance of a solid color as well. A solid color sheet typically consists of alpha cellulose paper containing various pigments, fillers and opacifiers, generally with a basis weight of 50 to 120 pounds per 3000 square foot ream. Similarly, print base papers are also pigmented and otherwise filled alpha cellulose sheets, usually lightly calendered and denser than solid color papers to improve printability, and lower in basis weight at about 40 to 75 pounds per ream, onto which surface is rotogravure or otherwise printed a design using one or more inks. Conversely, overlay papers are typically composed of highly pure alpha cellulose fibers without any pigments or fillers, although they can optionally be slightly dyed or "tinted", and are normally lighter in basis weight than the opaque decorative papers, in the range of 10 to 40 pounds per ream.

For high wear applications (such as flooring), it is often desirable to have a more highly wear resistant top layer. Accordingly, the overlay papers may contain hard, abrasive, mineral particles such as silicon dioxide (silica), and preferably aluminum oxide (alumina), which is included in the paper's furnish during the papermaking process. Alternatively, the abrasive particles can be coated on the surface of the overlay or decorative papers, during the "treating" process described below, prior to the final lamination step. Further, the abrasive particles can be added to the resin which is used to impregnate the overlay or decorative layers, thus causing the abrasive particles to be deposited on, and to a lesser extent, dispersed within such layers. As is known in the art, if the abrasive particles are deposited on the decorative layer, a separate overlay layer may not be necessary.

Typically, these overlay and decorative print and solid color surface papers are treated, or impregnated, with a melamine-formaldehyde thermosetting resin, which is a condensation polymerization reaction product of melamine and formaldehyde, to which can be co-reacted or added a variety of modifiers, including plasticizers, flow promoters, catalysts, surfactants, release agents, or other materials to improve certain desirable properties during processing and after final press curing, as will be understood by those skilled in the art. As with melamine-formaldehyde resin preparation and additives thereto, those versed in the art will also appreciate that other polyfunctional amino and aldehydic compounds can be used to prepare the base resin, and other thermosetting polymers, such as polyesters or acrylics, may be useful as the surface resin for certain applications. It is common practice, particularly in low pressure processes, to treat the decorative paper, and optionally a high wear abrasive loaded overlay, with a coreacted melamine-urea-formaldehyde (MUF) resin, or a blend of a melamine-formaldehyde (MF) resin and urea-formaldehyde (UF) resin, where the urea serves as an inexpensive, low cost resin solids extender. However, in the practice of the present invention, which is directed primarily to moisture resistant flooring applications, inclusion of urea, in any form, in the surface resin should be avoided if the best moisture and water resistance of the decorative laminate assembly is to be achieved. It will be appreciated, however, that urea can be used in the practice of the present invention.

Optionally, an untreated decorative paper can be used in conjunction with a treated overlay, provided the overlay contains sufficient resin to flow into and contribute to the adjacent decorative layer during the laminating process heat and pressure consolidation so as to effect sufficient interlaminar bonding of the two, as well as bonding of the decorative layer to the core. The equipment used to treat these various surface papers is commercially available and well known to those skilled in the art. The papers are normally treated to controlled, predetermined resin contents and volatile contents for optimum performance as will be well understood by those versed in the art, with typical resin contents in the ranges of 64–80%, 45–55% and 35–45% for overlay, solid color and print (unless used untreated) papers respectively, and all with volatile contents of about 5–10%. Overlay and decorative surface papers used with a low pressure process usually employ higher resin contents and catalyst concentrations (and/or stronger catalysts) to compensate for the lower pressure and resultant poorer resin flow, and the short thermal cure cycle, during the pressing operation.

The surface papers (ie., the overlay and decorative layers) of a high pressure decorative laminate are simultaneously bonded to the core during the pressing operation. The core of a conventional high pressure decorative laminate is typically comprised of a plurality of saturating grade kraft paper "filler" sheets, which have been treated or impregnated with a phenol-formaldehyde resin, which also simultaneously fuse and bond together during the laminating process, forming a consolidated, multi-lamina unified composite or laminate. Phenol-formaldehyde resins are condensation polymerization reaction products of phenol and formaldehyde. Again, those versed in the art will appreciate that a variety of modifiers such as plasticizers, extenders and flow promoters can be co-reacted with, or added to, the phenol-formaldehyde resin, that other phenolic and aldehydic compounds can be used to prepare the base resin, or that other types of thermosetting resins such as epoxies or polyesters may be used. A phenol-formaldehyde resin, however, is generally preferred in the manufacture of conventional high pressure decorative laminates, as is the use of a saturating grade kraft paper, generally with a basis weight of 70–150 pounds per ream, although other materials such as linerboard kraft paper, natural fabrics, or woven or non-woven glass, carbon or polymeric fiber clothes or mats may also be used as the core layer, either by themselves or in combination with kraft paper. In any case, these core layers must either be treated with a resin that is chemically compatible with the "primary" filler resin (and surface resin if used adjacent to it), or if used untreated, sufficient resin must be made available from adjacent filler plies to contribute to it and insure adequate interlaminar bonding. The filler resin preparation procedures, and filler treating equipment and methodologies, are also well known to those skilled in the art. With a conventional low pressure process, typically a core layer is not used, and the decorative surface components are bonded directly to a substrate material rather than to an intermediate core layer.

During the HPDL laminating or pressing operation, the various surface and filler sheets or laminae are cured under heat and pressure, fusing and bonding them together into a consolidated, unitary laminate mass, albeit asymmetric in composition throughout its thickness. As mentioned previously, typically this process is accomplished in a multi-opening, flat bed hydraulic press between essentially inflexible, channeled platens capable of being heated and subsequently cooled while under an applied pressure.

Typically in such a press, back-to-back pairs of collated laminate assemblies (with means of separation as described below), each consisting of a plurality of filler sheets and one or more surface sheets, are stacked in superimposed relationship between rigid press plates or "cauls", with the surfaces adjacent to the press plates. As is known in the art, such press plates are typically fashioned from a heat-treatable, martensitic stainless steel alloy such as AISI 410, and can have a variety of surface finishes which they impart directly to the laminate surface during the pressing operation, or they can be used in conjunction with a non-adhering texturing/release sheet positioned between the laminate surface components and the press plate, which will impart a selected finish to the laminate surface during pressing as well (and is later stripped off and discarded).

While martensitic stainless steel press plates are most commonly used in the manufacture of high pressure decorative laminate, optionally chrome plated to enhance their wear resistance and releasibility, austenitic stainless steels such as AISI 304, or other metal alloys such as brass, either with optional chrome plating, can also be employed, as can heat treatable wrought aluminum alloys, for example 6061 T6 temper, which surface may be anodized to increase its hardness and wear resistance. In addition, nonmetallic press plates or cauls may also be used advantageously. Such plates can be comprised of fully cured materials such as phenolic resin treated kraft paper, epoxy resin treated woven glass cloth, epoxy resin treated carbon fiber mat, or the like compositions. These plates can be optionally clad with a stainless steel or aluminum foil, which further optionally can be respectively chrome plated or anodized for improved wear resistance. Metallic press plates are typically manufactured by buffing and polishing, chemical etching, mechanical embossing, machining, shot peening, or combinations thereof, depending on the texture and surface finish desired, while the composite press plates are typically produced by a heat and pressure consolidation, i.e. lamination, and embossing process such as that described in U.S. Pat. No. 3,718,496 Willard. Release/texturing papers can be, or may have to be, used in conjunction with a particular type of press plate depending on its intrinsic self-release characteristics as well as the final laminate finish desired.

Typically, several pairs of laminate assemblies or "doublets" are interleaved between several press plates, supported by a carrier tray, to form a press pack or "book". The laminate pairs between the press plates are usually separated from each other by means of a non-adhering material such as a wax or silicone coated paper, or biaxially oriented polypropylene (BOPP) film, which are commercially available. Alternatively, the backmost face of one or both of the laminates' opposed filler sheets in contact with each other is coated with a release material such as a wax or fatty acid salt. Each press pack, so constructed, is then inserted, by means of its carrier tray, into an opening or "daylight" between two of the heating/cooling platens of the multi-opening, high pressure flat bed press. The press platens are typically heated by direct steam, or by high pressure hot water, the latter usually in a closed-loop system, and are water cooled.

A typical press cycle, once the press is loaded with one or more packs containing the laminate assemblies and press plates, entails closing the press to develop a specific pressure of about 1000–1500 psig, heating the packs at a predetermined rate to about 130–150° C., holding at that cure temperature for a predetermined time, then cooling the packs to or near room temperature, and finally relieving the pressure before unloading the packs on their carrier trays from the press. Those skilled in the art will have a detailed understanding of the overall pressing operations, and will recognize that careful control of the laminate's cure temperature and its degree of cure are critical in achieving the desired laminate properties (as are the proper selection of the resin formulations and papers used in the process).

After the pressing operation has been completed, and the press packs discharged from the press, the press plates are removed sequentially from the press pack build-up for reuse, and the resultant laminate doublets separated into individual laminate sheets. In a separate operation, these must then be trimmed to the desired size, and the back sides sanded so as to improve adhesion during subsequent bonding to a substrate. With a continuous laminating process, the trimming and sanding operations, and sheeting if desired, are usually done in-line directly after heat and pressure consolidation and curing between the rotating double belts. Conversely, with a conventional low pressure pressing operation, usually removal of unpressed surface paper edge "flash" is the only finishing step required.

As noted above, a relatively recent development in the building and design industries has been the growing widespread acceptance of using decorative laminates in flooring applications. Such flooring products, simulating stone or ceramic tiles, or wood planks, are most commonly produced either by adhering a conventional high pressure decorative laminate surfaced with a wear resistant overlay, as described in detail above, to a medium density fiberboard (MDF) or a premium grade high density fiberboard (HDF) substrate. Alternatively, the flooring composite material is pressed directly using a one-step low pressure process, again with an abrasive overlay protecting the decorative surface sheet and using MDF or HDF as the substrate. The fiberboard substrates are used in lieu of particleboard or other coarser, less expensive substrates due to the exacting machining requirements for the flooring product's tongue and groove or integral "snap lock" edge treatment joining systems that are most commonly used with these products. However, even with the more expensive HPDL clad flooring products, and using the best grades of "moisture resistant" HDF substrate (in which the board is produced at higher resin content with more moisture resistant resins), and even sized with wax and other "repellents", serious application restrictions and problems persist with the current generation of these most widely used flooring products when exposed to repeated or prolonged contact with moisture or water. These deficiencies are due to their intrinsic hydrophilic, in fact hygroscopic, characteristics, as such products are comprised for the most part of cellulosic wood fibers. These deficiencies are compounded by the non-isomorphic, directional orientation of these fibers inherent to the papermaking and fiberboard manufacturing processes.

Indeed, even the best moisture resistant HDF grades will expand an average of about 0.075% along its machine direction ("MD") and cross-machine direction ("CD") for each 1% increase in its equilibrium moisture content. HDF in its original state, as produced by a mill and used by a flooring manufacturer, has an average moisture content of about 6%. With a non-moisture contributing subfloor, such as lauan plywood, under the best conditions of low relative humidity "RH" (~10% RH) and high ambient temperature, the flooring HDF substrate moisture content will increase to about 7% (a +1% increase). On the other extreme, with the same type of subfloor and conditions of high humidity (~90% RH) and low ambient temperature, the HDF substrate moisture content will increase to about 9% (a +3% increase). Typically, more moderate temperature and humidity conditions will result in an increase in the floor's HDF substrate moisture content to about 8% (a +2% increase). The practical consequences of this increase in the floor's HDF substrate moisture content, and resultant increase in its overall dimensions, are summarized in Table I below. The expansion figures shown below are an average of the expansion changes in both the MD and CD directions.

TABLE I

| Subfloor | RH | Temp. | Moisture Content | Increase | Expansion With Room Dimension | | |
|---|---|---|---|---|---|---|---|
| | | | | | 10 ft. | 20 ft. | 30 ft. |
| HDF (from Mill) | — | — | 6% | — | — | — | — |
| HDF | Low | High | 7% | 1% | 0.09" | 0.18" | 0.27" |
| HDF | Mod. | Mod. | 8% | 2% | 0.18" | 0.36" | 0.54" |
| HDF | High | Low | 9% | 3% | 0.27" | 0.54" | 0.81" |

On the other hand, a traditional high pressure decorative laminate used as cladding (i.e., the laminated overlay, decorative and core layers) will lose moisture under low humidity conditions and shrink in both its MD and CD, and absorb moisture under high humidity conditions and grow in both its MD and CD dimensions. The NEMA specification LD 3-3.11 for dimensional change for VGS grade laminate (nominal thickness 0.028 inch "vertical grade standard"), which would typically be used to clad HDF for flooring applications, is 0.7% maximum in the machine direction and 1.2% maximum in the cross-machine direction in terms of total dimensional movement from low humidity conditions (less than 10% relative humidity at 70° C.) to high humidity conditions (90% relative humidity at 40° C.). Assuming equilibrium at ambient conditions of 50% relative humidity (midway for the test method), the laminate under high humidity conditions can grow 0.35% in the machine direction, and 0.60% in the cross-machine direction, with the consequences illustrated in Table II below:

TABLE II

| Relative Humidity | Direction | % Change | Expansion With Room Dimensions | | |
|---|---|---|---|---|---|
| | | | 10 ft. | 20 ft. | 30 ft. |
| 10% | MD | −0.35 | −0.42" | −0.84" | −1.26" |
| % | CD | −0.60 | −0.72" | −1.44" | −2.16" |
| 50% | MD | 0 | — | — | — |
| 50% | CD | 0 | — | — | — |
| 90% | MD | +0.35 | +0.42" | +0.84" | +1.26" |
| 90% | CD | +0.60 | +0.72" | +1.44" | +2.16" |

The relatively poor moisture resistance of the high pressure decorative laminate is primarily related to the phenol-formaldehyde ("phenolic") resin impregnated core layer, in part because it comprises the majority of the laminate bulk and normally has a greater cellulose fiber to resin ratio than the surface components, and partly because of the more hydrophilic nature of "modern" water-solvated phenolic resin systems. Simply increasing the phenolic resin content in the core sufficiently to significantly improve moisture resistance is not practical since it would result in increased resin flow and bleed-out during pressing, as well as possible resin bleed-through into the laminate surface. Conversion to a more hydrophobic, organic solvent based modified phenolic resin is prohibited because of environmental considerations, and both alternatives are precluded because of their increased cost.

Thus, while the dimensional movement of the total floor assembly will be governed predominantly by the much greater mass of the HDF substrate, under high humidity and moisture, and in particularly wet, conditions, the greater movement of the flooring's HPDL cladding could warp convex and buckle the individual floor tiles or planks, lifting them off the subfloor.

Considering the recognized deficiencies in the current, most popularly used high and low pressure decorative laminate/HDF-based flooring products, they perform reasonably well in "small room", low humidity, moisture and water environments (generally termed "residential applications"), where the effects of the compounded dimensional changes of the individual floor segments on the entire installation can be tolerated, if not controlled. Even with such installations, flooring manufacturers and installers typically recommend inclusion of (necessarily raised) expansion joints a minimum of every 20 feet to avoid buckling of the floor with any moisture uptake, although such expansion joints are aesthetically unattractive and physically intrusive. Accordingly, wet area installations, such as bathrooms, are not generally recommended.

Floor moisture protection is commonly attempted by recommending use of an underlayment between the subfloor and the new floor, which is typically comprised of foam materials sandwiched between polymeric films. These so called "floating floor" installations only help control the rate, not the total equilibrium amount, of moisture uptake from underneath the flooring panels and create the disadvantages of restricting spilled water drainage from above through the joints (thus permeating into the peripheral HDF substrate, which can cause severe swelling in those areas). Further, such installations impart a hollow sounding, springy feel to the entire floor when walked upon. The one important advantage of a floating floor installation, however, is that the foam inclusions act as shock absorbers and significantly improve the floor's impact resistance; the decorative laminate assembly itself having inherently very poor impact resistance if installed directly on a hard, rigid subfloor without the underlayment.

The deficiencies in existing decorative laminate are exacerbated when such conventional, decorative laminate clad HDF floors are installed on concrete (which is typical for commercial applications). The use of such existing decorative laminates in commercial applications has been largely avoided because of their aforementioned moisture and water sensitivity. Indeed, a newly poured and set concrete floor will typically generate about 14 pounds of water per 1000 square feet per day (14 lbs./1000 sq. ft./day), and HDF in contact with such a floor will reach an equilibrium moisture content of about 18%. Even an old, fully cured concrete floor on "dry" ground will continue to transmit water at an average rate of about 3 lbs./1000 sq. ft./day and result in a HDF moisture content of about 14%. Above about 12% moisture content in the HDF, the concern is not only dimensional change, but actual physical swelling and degradation of the fiberboard itself, as well as fungal and mildew damage. Furthermore, in areas with a high water table, such as southern Florida, where a typical house is built on a concrete slab without a basement, even old concrete transmits moisture at a rate similar to that for new concrete, with the same deleterious effects to HDF-based flooring. As such, these "wet area" residential and commercial flooring applications have largely been relegated to vinyl composition tiles and the like products. While they have the prerequisite moisture resistance and dimensional stability, by their very nature, they are quite soft and easily dented by heavy or impacted objects, and decorative designs are severely restricted to abstract stone-like patterns and the like.

U.S. Pat. No. 6,093,473 ("Min") proposes a HPDL clad flooring assembly, utilizing a moisture resistant polymeric substrate (in particular, PVC), in conjunction with essentially a conventional high pressure decorative laminate cladding with the typical phenolic resin impregnated kraft paper based core, which only addresses part of the problem posed by conventional HPDL clad flooring assemblies (i,e., only addresses the problems associated with the HDF substrate).

A melamine-formaldehyde ("melamine") surface resin, when sufficiently cured, has intrinsically good moisture resistance, as evidenced by the performance of such articles as molded melamine dinnerware. Thus, it is considered desirable to retain a melamine resin in the surface of an improved flooring product because of its moisture resistance as well as its other superior properties such as its color and clarity, hardness, heat and cigarette resistance, light stability and fade resistance, cleanability and optical compatibility with alumina inclusions required for enhanced abrasion and wear resistance. However, simply using a melamine resin, with its superior moisture resistance, in the core of the laminate, as well as in the surface, is precluded since they are most compatible with cellulosic, non-polymeric materials (which inherently degrade moisture resistance), and melamine resins are intrinsically brittle, such that the resultant laminate's stress crack and impact resistance would be deleteriously affected further, as would its machinability.

Further, while the use of an unsaturated and crosslinkable polyester "laminating" resin impregnated woven or nonwoven glass, carbon or polymeric fiber cloth or mat, as is known in the art, could possibly improve moisture resistance and flexibility of the laminate core, this type of core would have several disadvantages. Such disadvantages would be relatively high cost, difficult processability with conventional HPDL filler treating equipment, serious environmental problems, the core would still be comprised of a discontinuous moisture barrier, and such polyesters would be incompatible with the desired requisite melamine surface resin, curing by free radical rather than condensation polymerization. While the latter problem could be technically circumvented with use of a bridging agent or "tie sheet" as taught in U.S. Pat. No. 6,159,331 ("Chou"), which has both unsaturated polyester and melamine resin curing functionality, such materials are difficult to synthesize and expensive, and as such, best avoided if possible.

Accordingly, there remains a need for a moisture resistant and dimensionally stable decorative laminate assembly, and in particular, a decorative laminate cladding that can be used where there is repeated or prolonged exposure to moisture or water.

Further, thin, conventional decorative laminate claddings, with a phenolic resin impregnated kraft paper core, are by their very nature quite brittle and easily fractured. In the Min flooring assembly, where such a laminate is bonded to a PVC material (which is relatively soft and easily deformed), impact resistance is very poor. Indeed, a ball impact test of the product produced in accordance with Min results in instantaneous denting of the substrate and simultaneous circumferential cracking of the laminate cladding. Thus, there is a further need for a tougher, more impact resistant decorative laminate cladding.

Moreover, with traditional decorative laminate assemblies, it has been necessary to adhere the laminated cladding to the substrate through the use of an adhesive. Such adhesive, however, adds to the cost and complexity of manufacture of the decorative laminate assembly, typically requiring a separate processing step.

Accordingly, in view of the above, there is a need for a decorative laminate flooring assembly with improved moisture resistance and dimensional stability, as well as improved toughness, impact resistance and durability, that will offer a wide variety of design choice to the architect and consumer, and will reduce the cost and complexity of assembly. Such a decorative laminate assembly has not heretofore been provided.

SUMMARY OF THE INVENTION

The aforementioned needs are addressed by a decorative laminate assembly having a decorative laminate top layer assembly. This top layer assembly includes, in descending superimposed relationship, a decorative layer and a core layer that includes PETG, or other polymeric material. Preferably, the top layer assembly also includes a wear resistant overlay layer on top of the decorative layer, and the core layer's PETG is in a sheet form. The decorative laminate assemblies of the present invention may be formed by bonding the decorative layer and PETG core layer directly to the water resistant substrate without use of an adhesive, in a single operation. Surprisingly, it has been discovered that PETG not only bonds remarkably well to the melamine resin treated (or untreated) decorative layer, but also simultaneously bonds extremely well to filled PVC composite board or cement fiberboard substrate. As such, a single-step pressing operation can be advantageously employed, and the material, labor and equipment costs for the adhesive application to the substrate (and/or top layer), and subsequent bonding operation, can be avoided. The decorative laminate assemblies of the present invention can be used for a variety of purposes, including flooring applications. When the present invention is used for flooring applications, it is preferred that the overlay layer has enhanced wear resistant qualities and that the water resistant substrate comprise PVC or cement fiberboard.

DETAILED DESCRIPTION OF THE INVENTION

While the present invention is capable of embodiment in various forms, there is shown in the following drawings, and will be hereinafter described, a presently preferred embodiment, with the understanding that the present disclosure is to be considered as an exemplification of the invention, and is not intended to limit the invention to the specific embodiment illustrated.

Figure 1:
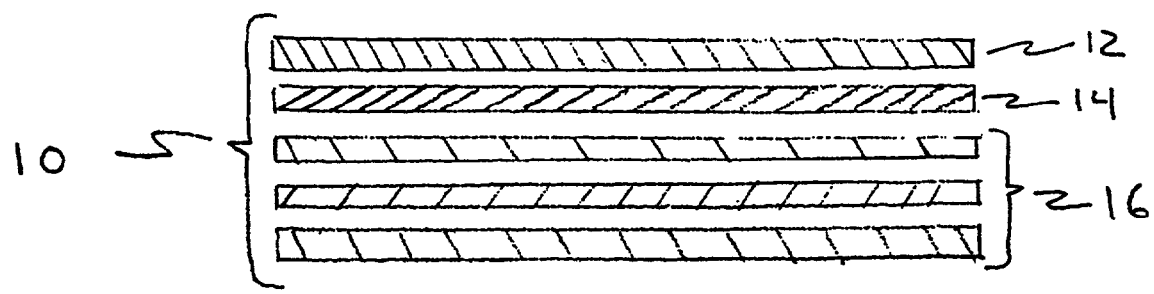
FIG. 1 is a partial, cross-sectional, exploded, elevational view of the components of a conventional high pressure decorative laminate.

FIG. 1 shows a conventional high pressure decorative laminate 10 having, in descending superimposed relationship, a melamine resin impregnated abrasive-loaded overlay sheet 12, a melamine resin impregnated (or alternatively, an untreated) decorative print sheet 14, and one or more plies of phenolic resin impregnated saturating grade kraft paper core sheets 16 bonded together and consolidated into a unitary decorative laminate article 10 by the high pressure pressing process described above.

Figure 2:
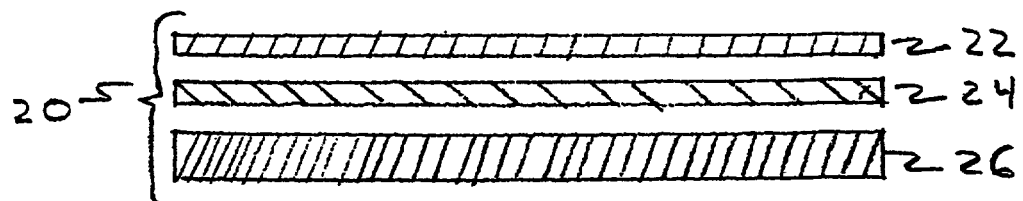
FIG. 2 is a partial, cross-sectional, exploded, elevational view of the components of the high pressure decorative laminate according to the present invention.

Referring to FIG. 2, the composition of the decorative laminate portion 20 of a preferred embodiment of the present invention is shown, which includes, in descending superimposed relationship, a melamine resin impregnated abrasive-loaded overlay sheet 22, a melamine resin impregnated (or alternatively, an untreated) decorative print sheet 24, and a core layer 26 comprising at least one sheet of polyethylene terephthalate glycol ("PETG"). It will be understood that the core layer 26 may also comprise a plurality of PETG sheets, composed of all the same grade or a variety of grades. Further, although PETG sheets are preferred, PETG in other forms (i.e., in a fibrous form) could be used with the present invention.

PETG is a new class of thermoplastic polymeric materials that have recently been developed by Eastman Chemical Company, which can be extruded as continuous film or sheets. U.S. Pat. No. 5,643,666 Eckart, et al. describes the chemical composition of the PETG copolyesters as polyethylene terephthalate polyesters modified with cyclohexanedimethanol repeat units, with the cyclohexanedimethanol being either the cis- or trans-, 1,3- or 1,4-isomers (or mixtures thereof). The main dicarboxylic acid monomers are terephthalic acid or dimethylterephthalate, and the main diol monomers are ethylene glycol and cyclohexanedimethanol, although lesser amounts of other dicarboxylic acids (or their esters) and diols can also be included in the formulation. In accordance with Eastman Chemical Company terminology, when the molar ratio of the ethylene gycol component is greater than the cyclohexanedimethanol component, the resultant polymer is referred to as PETG. Conversely, with excess cyclohexanedimethanol, i.e. its molar ratio exceeds that of the ethylene glycol, the polymeric reaction products (along with terephthalic acid or its dimethyl ester) are termed PCTG (polycyclohexanedimethyl terephthalate glycol). In essence, PCTG polymers are merely cyclohexanedimethanol-rich forms of PETG. Certain PCTG copolyesters, such as Eastman Chemical's PCTG 5445, are also useful in the practice of the present invention, either alone or in combination with sheets of PETG or other materials, and for simplicity, are included under the broader definition of PETG employed herein. Accordingly, it will be understood that the term "PETG" as used herein and in the claims includes PETG and derivatives thereof, including PCTG. Further, as those skilled in the art will appreciate, any other material similar to PETG can also be used as the core layer 26. For instance, other PET polyester diol modifiers (i.e., other than cyclohexanedimethanol) could possibly create a new class of PETG copolyesters with similar properties to current PETG, which may also be useful in the practice of the present invention. Other materials that could be used for the core layer are discussed below.

The PETG copolyester sheets of Eckart, et al. are glass-like in transparency and suitable for use in decorative glazing applications. At room temperature, the PETG sheets are extremely tough and resilient, similar to polycarbonate materials, while under pressure at elevated temperatures on the order of those used for conventional HPDL manufacture, they soften, melt and flow. The complete range of ethylene glycol and cyclohexanedimethanol "glycol" monomer mole ratios used for the polymerization, in conjunction with terephthalic acid or dimethylterephthalate, of various PETG (or PCTG) polymers that would be useful in the practice of the present invention has not been established. As the mole ratio of either glycol monomer becomes larger, i.e. the mixture becomes increasingly more ethylene glycol rich, or in the other direction, increasingly more cyclohexanedimethanol rich, the softening temperatures and melting temperatures of the resultant PETG (and PCTG) polymers tend to increase in both directions. At one extreme end of the range is conventional polyethylene terephthalate ("PET", commonly used with plastic bottles), the melt polymerization reaction product of terephthalic acid or dimethylterephthalate and only ethylene glycol as the glycol monomer, i.e. no cyclohexanedimethanol functionality present in the polymer, which has a melt temperature of about 250–260° C. At the other extreme end of the range is polycyclohexanedimethyl terephthalate (termed "PCT"), the melt polymerization reaction product of terephthalic acid (or its dimethyl ester) and only cyclohexanedimethanol as the glycol monomer, i.e. no ethylene glycol functionality present in the polymer, which has an even higher melt temperature of about 280–290° C. Both of the "pure glycol" polymers, i.e. PET and PCT, are more crystalline than the intermediate mixed glycol PETG (and PCTG) polymers, which are amorphous in nature. However, post-polymerization heat treatment of the former type, e.g., quenching or remelting in the presence of a organometallic nucleating agent, might increase their amorphousness and reduce their melt temperatures sufficiently to make them useful in the practice of the present invention as well. Although PETG (and by inference, PCTG versions thereof) are available in various grades and thicknesses that can be used for the present invention, it is preferable to use Eastar PETG Copolyester 6763, which is available from the Eastman Chemical Company.

As originally contemplated, the problems foreseen with PETG were whether the PETG, being a linear, saturated polyester, would even bond by itself to the melamine resin impregnated surface materials (i.e., the melamine resin treated overlay and decorative print or solid color papers), or behave more like a BOPP separator sheet (which sticks to neither melamine or phenolic resins). Further, if the latter case, it was questionable whether a bridging agent or tie sheet of the type disclosed by Chou (U.S. Pat. No. 6,159,331), with at least some polyester "character", albeit unsaturated, might be useful in facilitating bonding between the two dissimilar polymers.

Surprisingly, however, after pressing the PETG film in conjunction with conventional HPDL melamine resin treated overlay and decorative print or solid color papers, the PETG film had extremely good bond strength as evidenced by passing (after bonding to a suitable substrate) both a 7-day 50° C. water soak test and a real cigarette resistance test, without any PETG core/decorative surface layer blistering or other delamination evident. It was also found that the PETG film will also bond remarkably well to a "raw", untreated decorative print sheet (under a resin-rich overlay) with similar results as with the melamine resin treated print sheet. However, the best moisture resistance, use of a treated print sheet is preferred in the practice of the present invention.

The decorative laminate assembly and process for its manufacture as originally contemplated involved bonding of a melamine resin surfaced, PETG core high pressure decorative laminate so formed with a suitable adhesive to a suitable substrate such as a filled PVC composite board (or alternatively cement fiberboard). Surprisingly, however, it was later discovered that the melamine resin impregnated surface components, the PETG core sheet, and a PVC "vinyl" composite board, without a discrete adhesive layer between the latter two materials, could be pressed together under controlled conditions to form a unitary decorative laminate assembly mass, with excellent bonding of both the melamine surface and PVC substrate to the PETG core as evidenced by passing a 7-day 50° C. water soak test without any blistering or other form of delamination evident at either PETG interface. This second surprising discovery (the first being that PETG bonds to the melamine resin surface) that PETG will bond directly to a PVC composite board (and also cement fiberboard) also significantly simplifies the process for producing the desired decorative laminate assemblies, and allows for a single-step process, preferably utilizing a multi-opening, flat-bed laminating press to do so.

Figure 2A:
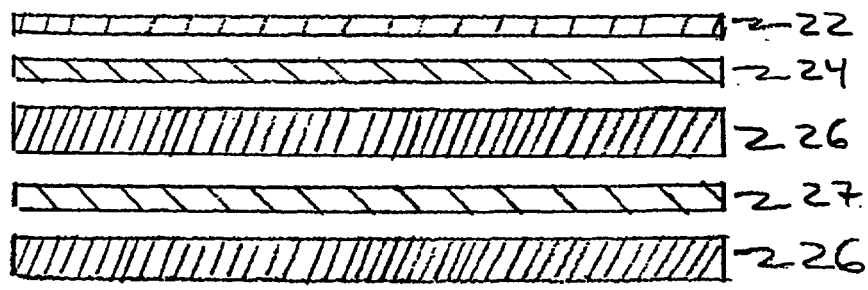
FIG. 2A is a partial, cross sectional, exploded, elevational view of another embodiment of the high pressure decorative laminate according to the present invention.

It will be understood that in addition to the core layer 26 being solely comprised of a single multiple layer or layers of PETG, the core layer 26 can further comprise a layer 27 of woven or non-woven glass, carbon or polymeric fiber cloth or mat (or other material) sandwiched in between two or more sheets of PETG, as shown in FIG. 2A. In such a configuration, the layer of woven or non-woven glass, carbon or polymeric fiber cloth or mat would be substantially "sealed" by the PETG layers, thus making the sealed layer water resistant. This sandwiched structure would impart additional structural characteristics to the core layer 26.

It should also be understood that other polymeric materials, particularly polymeric films (for ease of processing), might be used as a core layer 26 to thermally fuse and bond the melamine resin impregnated surface components to the substrate of choice. One such material is a proprietary acrylic terpolymer tradenamed "Korad" Acrylic Film (0.002 inch thick, code 39030) manufactured by Polymer Extruded Products, Inc., which is comprised of poly (methyl methacrylate) and two other unidentified acrylates. The bond strength between the melamine resin treated decorative layer and a filled PVC vinyl substrate, as judged by a 7-day 50° C. water soak test, was very good. The lack of thickness with such a material can be compensated for with additional thickness of the substrate to maintain the desired overall thickness of the decorative laminate assembly. However, while the bonding is acceptable with use of such a material, the advantages of a relatively thick and tough PETG-type core interlayer are lost, particularly as it relates to enhanced impact resistance. As such, PETG is the preferred core material, although other thermoplastic and thermosetting polymers can be employed within the scope of the present invention.

With regard to the overlay layer 22, although it is preferred that the overlay layer 22 is wear resistant, it should be noted that the overlay layer may comprise a simple overlay sheet without enhanced wear resistant properties. Further, as described above, it is possible that abrasive particles can be coated on or dispersed in the decorative layer 24. In such a configuration, the overlay layer would not be necessary for the practice of the present invention.

Figure 3:
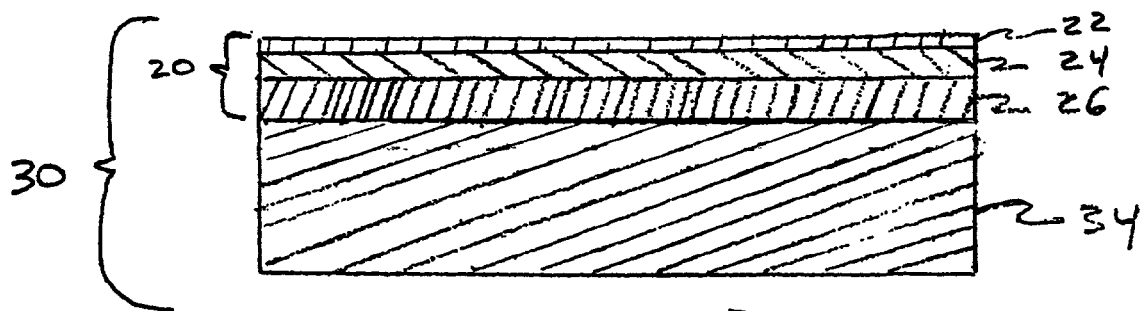
FIG. 3 is a partial, cross-sectional, elevational view of the decorative laminate flooring assembly according to the present invention.

FIG. 3 also shows the decorative laminate assembly of the present invention, generally designated as 30, in which, in descending superimposed relationship, overlay layer 22, decorative layer 24 and core layer 26 of the present invention are directly bonded to a suitable moisture resistant substrate 34. The term "directly bonded" as used herein means without the use of an additional adhesive layer. However, the absence of the term directly bonded should not be construed to mean that an adhesive layer is necessarily present. The layers are preferably bonded together and consolidated into a unitary decorative laminate assembly 30 by a modified pressing process in a conventional multi-opening flat bed press in a single process step, where a lower temperature and pressure than normally used to manufacture a conventional high pressure decorative laminate are employed advantageously to control the melting and flow of the PETG layer, as well as deformation or melting of the filled PVC substrate, as will be described in detail in the examples set forth below. It should be noted, however, that those skilled in the art will appreciate that the articles of the present invention could also be produced using single-opening, low pressure decorative laminate or continuous laminate processes as well. Further, it will be understood that any laminate surface finish can be used in conjunction with the present invention. However, at press cure temperatures, with a soft, pliable PETG sheet directly under the decorative laminate surface, and a compressible PVC composite board under that, such a laminate and press pack construction is ideally suited for relatively deep embossed texturing, and particularly registered embossing, e.g. a registered embossed tile design decorative laminate assembly, with rough tile surfaces and depressed grout lines adjacent to them, that can be advantageously used for flooring applications. In such a process, the compressible materials themselves act as internal cushioning to minimize localized high pressure areas and prevent telegraphing and "shadowing" on adjacent laminates in the pack. The degree or depth of the embossing is primarily restricted by the strain or elongation limit of the melamine resin impregnated surface papers; hence, besides improved impact resistance, formability is another reason why use of a highly plasticized melamine surface resin is preferred.

Preferably, the moisture resistant substrate 34 is either a filled PVC sheet or cement fiberboard. As one skilled in the art will appreciate, however, any moisture resistant substrate material can be used for the substrate 34 in the practice of the present invention. It should be appreciated that "moisture resistant substrate" as that term is used herein implies the material will be dimensionally stable, and not grow or swell significantly with any prolonged or repeated exposure to, and absorption of, moisture or water. It does not imply that the substrate material must necessarily be impermeable and impervious to water. Further, although a moisture resistant substrate is preferred for the practice of the present invention, it is possible that other substrates, such as HDF, MDF, particleboard, etc. can be used, but with the caveat that such an assembly would not be well suited for wet or moist conditions due to the aforementioned problems with such other substrates.

Most preferably, the substrate 34 will be amenable to machining with conventional tooling (ie., saws, routers, tenoners and the like), and be relatively inexpensive. For example, sheets or boards comprised of various virgin or recycled polymerics, or inorganic-based composites, can all be employed to achieve the desired results.

As mentioned above, however, two substrate materials in particular are considered useful and preferred for the present invention because of their respective mechanical properties. Namely, these two materials are a filled polyvinyl chloride (PVC) composite and an inorganic fiber reinforced cement board (IRCB), commonly referred to in the industry as cement fiberboard.

The PVC composite board is typically highly filled with inorganic materials such as finely powdered talc (magnesium silicate) and/or calcium carbonate. It is relatively soft, and has good mechanical and sound dampening characteristics when walked upon. As such, it is an ideal substrate for use in the practice of the present invention for wet residential applications, such as house basements and bathrooms, and for light and medium load commercial flooring in offices and the like. A similar substrate composite material that has also been found to be useful in the practice of the present invention is a filled PVC sheet, comprised in part of fused virgin and/or recycled PVC chips embedded in a filled PVC composite substrate, to which has been applied by the manufacturer a polyurethane resin coating to seal the surface (which is subsequently bonded to the PETG core in the practice of the present invention), and with a paper-based "felt" backing layer, which tends to improve bonding to a suitable flooring adhesive for use with wood or concrete subfloors.

Figure 4:
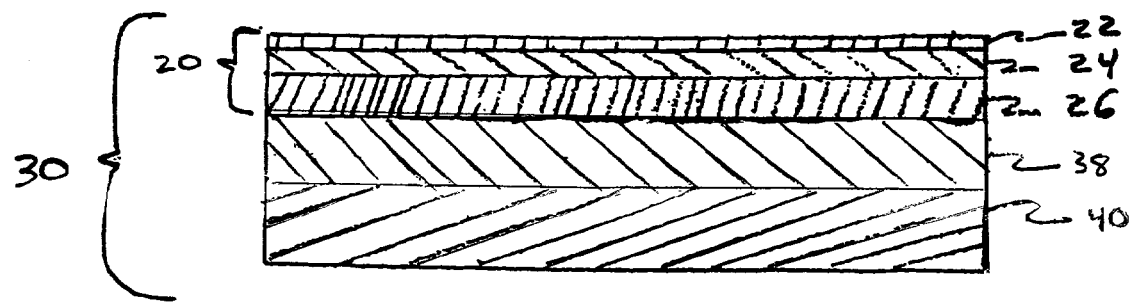
FIG. 4 is a partial, cross-sectional, elevational view of another embodiment of the decorative laminate of the present invention, showing a two-layer substrate.

While FIG. 3 depicts the moisture resistant substrate 34 of the present invention as a single, homogeneous sheet, particularly for a filled PVC vinyl substrate, two or more thinner layers 38, 40 might be advantageously used to enhance certain properties of the decorative laminate assembly, as shown in FIG. 4. For example, a more highly filled, less plasticized and harder vinyl sheet 38 could be positioned adjacent to the PETG core to reduce compressibility of the surface of the decorative laminate assembly and further improve its impact resistance, and conversely, a less filled, more highly plasticized and softer, more compressible vinyl sheet 40 could be used on the back side of the decorative laminate assembly to improve its conformation to irregularities in the subfloor surface (particularly concrete) to which it is bonded. It has been found that multiple layers of filled PVC vinyl sheet material can be fused and bonded together under pressing conditions similar to those detailed in Example 2 below. A separate polymeric bonding material, such as the Korad Acrylic Film described above, can also be used to effect bonding together of two or more plies of similar of dissimilar filled PVC vinyl sheets.

As opposed to a PVC composite, cement fiberboard is very hard and non-compressible and, as such, is well suited for use as the substrate in the practice of the present invention for heavy load commercial flooring applications (i.e., where heavy objects are placed stationary on a floor (and only moved periodically) or rolled over a floor, or where permanent deformation could be problematic, such as department stores with heavy display case pedestals and hotel lobbies). Cement fiberboard has now replaced cement asbestos board (CAB) in the industry because of carcinogenacity concerns with use of the latter, and is composed of mineral fibers with Portland cement as the binder, produced in various grades with or without small amounts of partially hydrolyzed polyvinyl alcohol/acetate, or an acrylic latex, as modifiers to enhance its internal bond strength.

Prior to the advent of decorative laminate flooring, fire retardant high pressure decorative laminates, with an otherwise conventional phenolic resin impregnated kraft paper core (typically NEMA fire retardant grades HGF and VGF) have historically been bonded to cement asbestos board, and later to cement fiberboard. Such bonding was typically performed with Indspec (formally Koppers) Penacolite G1149A/G1131B or G1124A/G1124B two-part, phenolic/resorcinol resin based adhesives, to produce fire-rated panel assemblies meeting U.S. Coast Guard, and Class I or Class A standards (ASTM E-84 or UL723 tunnel tests respectively). This product was particularly useful for bulkhead and other stringent marine applications. Surprisingly, it has been found that the decorative laminate portion of the present invention, comprising the melamine resin impregnated surface and PETG core, does not easily burn, and generates little smoke, suggesting that when bonded directly to cement fiberboard, the decorative laminate floor assemblies of the present invention may be particularly useful in applications where very strict fire codes are in force (i.e., apartment building hallways in major cities). Such assemblies might also be used for wall and ceiling paneling as well.

Figure 3A:
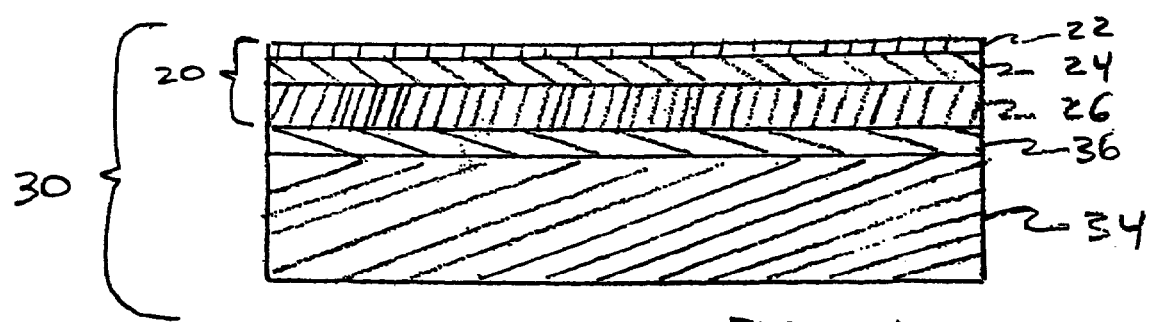
FIG. 3A is a partial, cross-sectional, elevational view of the decorative laminate flooring assembly according to the present invention, with the use of an adhesive layer.

It should be noted that although the preferred embodiment of the invention directly bonds the melamine resin/paper surface and PETG core to the substrate through use of the PETG layer, it is nevertheless within the scope of the present invention that an adhesive layer can be used to bond the melamine resin/paper surface and PETG core to the substrate, as shown in FIG. 3A. With regard to the adhesive layer 36 used for bonding the PETG core to the substrate, any adhesive system can be used that is moisture and water resistant and has an affinity for PETG (as well as the substrate material). It is preferred, though, that such an adhesive layer 36 form a continuous film when applied and is rigid when set and cured. Many such adhesive systems meet these properties. A Penacolite phenolic/resorcinol resin-based adhesive is useful, particularly in conjunction with cement fiberboard for heavy duty commercial and fire-rated applications. Another adhesive system which has been used to advantage to bond the PETG core decorative laminate of the present invention to both filled PVC and cement fiberboard substrates is Daubert Chemical Company's Daubond DC-8855A/DC-8855B, a two-part epoxy, which has the advantage of being able to be used in a cold-pressing operation. This adhesive exhibits extremely good water resistance and bond strength, even when the decorative laminate's PETG back is unsanded (which is preferred in the present invention when using an adhesive), with the proviso that BOPP be used as the separator sheet during pressing, such that no release agent contamination of the PETG back occurs, which would interfere with bonding. Conversely, examples of adhesives and "glues" that are not recommended include elastomeric, neoprene-based "contact" adhesives, polyvinyl acetate (PVAc) emulsions, polyvinyl alcohol (PVA), urea-formaldehyde (UF), casein or other animal-based glues, due to either poor moisture resistance, mechanical strength or fungistatic properties.

Preferred embodiments of the present invention will be described in detail in the following examples, where it should be appreciated that the scope of this instant invention is not limited in any way by the description of the preferred embodiments set forth herein. The following specific examples are provided to illustrate further aspects and unique advantages of the present invention, and other features and embodiments should become apparent to those skilled in the art. The examples are set forth for illustration only, and should not be construed as limitations on the scope of the present invention.

EXAMPLE 1

Bonding with Adhesive

A melamine-formaldehyde resin was prepared by normal procedures familiar to those versed in the art, with a 1.4/1 formaldehyde/melamine mole ratio, and co-reacted with 7% dicyandiamide based on melamine and formaldehyde solids, in a 50% aqueous solution at 92° C. The following resin blend was then prepared with this plasticized melamine resin, with all parts being parts by weight:

69.0 parts melamine resin
4.6 parts polyethylene glycol 600 MW (Union Carbide Carbowax 600)
5.7 parts Cymel 385 partially methylated melamine resin (CyTec Industries)
20.5 parts water
0.1 parts MoldWiz INT-1E-11S release agent (Axel Plastics)
0.1 parts Cycat 4040 p-toluene sulfonic acid catalyst solution (CyTec Industries)
100.0 parts Total Those versed in the art will appreciate that other polyfunctional amino and aldehydic compounds can be used to prepare the base resin, and other thermosetting polymers, such as polyesters or acrylics, may be useful as the surface resin for certain applications. However, for the practice of the present invention, use of a highly plasticized melamine-formaldehyde resin is preferred.

Mead Corporation clear, abrasive loaded overlay (code 85062), with a 34 pound per ream basis weight, was treated with the above resin blend to a resin content of about 64–66% and a volatile content of about 6–8%. The abrasive overlay is sized with enough alumina particles of sufficient diameter to result in a 12,000 cycle Taber abrasion rating (NEMA Wear Resistance Test Method LD 3-3.13 1995). The resin content is defined as the difference between the treated weight of the paper and the initial raw weight of the paper, divided by the treated weight of the paper and expressed as a percentage, and the volatile content is defined as the difference between the treated weight of the paper and the bone dry treated weight of the paper, divided by the treated weight of the paper and expressed as a percentage.

Similarly, a printed decorative paper, with a 65 pound per ream basis weight, was treated to a resin content of about 39–41% and a volatile content of about 6–8% with the same resin blend. The print paper had on its top surface a rotogravure printed design simulating multi-colored ceramic tiles surrounded by cementitious grout lines in a checkerboard pattern, said tiles being approximately 11⅝ inches square with approximately ⅜ inch wide grout lines in the length direction of the web, 1 inch wide grout lines in the cross-web direction, and ½ inch wide grout lines along both edges of the nominal 4 foot wide web (the wider cross-web and edge grout lines needed to accommodate subsequent saw kerf cutting and secondary trimming losses).

A press pack was then assembled on a carrier tray with the following materials in ascending superimposed relationship: 6 plies of untreated kraft "cushion", a double-sided phenolic plate with a random pebbly texture, 1 ply of BOPP film, 1 ply of Ivex Corporation LC-53 texturing/release paper (coated side facing up), 1 ply of treated overlay, 1 ply of treated print (printed side facing down), 1 sheet of 0.020 inch thick PETG (with its protective film removed from the bottom side and retained on the top side, 1 ply of BOPP film, 1 sheet of 0.020 thick PETG (with its protective film removed from the top side and retained on the bottom side, 1 ply of treated print (printed side facing up), 1 ply of treated overlay, 1 ply of LC-53 texturing/release paper (coated side facing down), 1 ply of BOPP film and then another phenolic textured plate, thus completing the build-up of one laminate doublet. The build-up was continued in the same sequence until the completed press pack, with 6 plies of untreated kraft cushion on top, contained a total of 4 phenolic textured plates with 3 laminate doublets (pairs) sandwiched in between. The grade of PETG sheet used was Eastman Chemical Company Eastar PETG Copolyester 6763.

The press pack so assembled was then loaded into a high pressure flat bed press, which was then closed and pressurized to about 1100 psig specific pressure. The press pack, so configured, was then heated to between 125° C.–127° C. in about 20 minutes, and held at that temperature for 25–30 minutes before rapidly cooling to near room temperature in about 20 minutes, after which press pressure was released, the press opened and the press pack removed. Although, as those skilled in the art will recognize, other types of newer generation equipment can be used to produce high pressure (and low pressure) decorative laminates, for example a continuous double-belt press, a single or restricted opening "short cycle" flat bed press, or an isothermal "hot discharge" flat bed press, a conventional multi-opening press is still the type most used in the art, and most suited to the practice of the present invention.

It should be stressed that the press pack top temperature with the PETG grade used and at the preferred press pressure stated, is critical in that below about 125° C. the PETG does not soften and flow properly, and above about 127° C. it can melt and exude excessively from the press. Use of other PETG grades may require different temperature and pressure conditions for optimum results. The phenolic textured plates were subsequently removed sequentially for reuse, the laminate doublets recovered and then separated into individual laminate sheets. The protective film was stripped off the backs of the laminates, and their edges then trimmed without any back sanding. The resultant laminates thus obtained were about 1/32 inch thick.

Panel assemblies were then prepared by bonding the PETG core laminates of the present invention so prepared to 3/32 inch thick filled PVC sheets, using the Daubond DC-8855 adhesive system previously identified at a spread rate of about 0.03 pounds per square foot, and then pressing the prepared assembles, stacked face up and interleaved with BOPP film, with 6 plies of raw kraft cushion top and bottom, in a low pressure, flat bed hydraulic press. Bonding was affected by cold pressing the panel assemblies at about 40 psig specific pressure for about 12 hours. The final pressed decorative laminate panel assemblies obtained were about ⅛ inch thick.

The improved decorative laminate assemblies of the present invention, so prepared by the method described in detail above, were then rough cut crosswise through the centers of the 1 inch wide grout lines, an then the nominal 1 foot by 4 foot tile "planks" (each containing four square tiles) were carefully edge trimmed leaving 3/16 inch wide peripheral grout lines, with a 5 degree back cut of the vinyl substrate to insure neat butt joints. Finally, the tile planks so prepared were installed on a cement test floor, to evaluate "real world" long-term wear, damage and moisture effects, using Macklanburg-Duncan MD 919 Vinyl Back Flooring Adhesive, suitable for use with both wood-based and concrete subfloors, by the prescribed manner using a trowel with a spread rate of about 150 square feet per gallon. The final floor installation was comprised of square tiles surrounded by ⅜ inch wide grout lines on 12 inch centers.

Comparative impact resistance testing of a sample of the above decorative laminate assembly flooring made in accordance with the present invention, and other selected flooring products, all bonded to concrete patio tiles and tested in accordance with the NEMA LD 3-3.8 1995 Ball Impact Resistance test method, except replacing the ¾ inch thick, 45 pound per cubic foot medium density particleboard substrate with a concrete slab, was conducted with the following results as shown in Table III below:

TABLE III

| | Impact Resistance (Inches) |
|---|---|
| 0.8 mm Low Pressure Melamine/HDF Flooring(1) | <20 |
| Conventional Phenolic/Kraft Core HPDL Clad Filled PVC(2) | <20 |
| PETG Core HPDL Clad Filled PVC(3) | 20–40 |
| PETG Core HPDL Clad Filled PVC(4) | 40–60 |

Notes:
(1)Formica Flooring, usually installed as a floating floor.
(2)LG Prime High Pressure Laminate Flooring, a product of LG Chem, a subsidiary of Lucky Goldstar LG Group (South Korea), produced in accordance with U.S. Pat. No. 6,093,473.
(3)Produced in accordance with the present invention as described in the above example, except that the surface components were treated only with the neat dicyandiamide modified melamine resin.
(4)Produced in accordance with the present invention as described in the above example, with the surface components treated with the melamine resin, Cymel 385, PEG 600 blend as the preferred embodiment in the above example.

EXAMPLE 2

Direct Bonding without Adhesive

The Mead abrasive loaded high wear overlay treated with the preferred plasticized melamine resin blend detailed and used in the previous Example 1, corresponding to that used for Sample 4 of Table III, was also used for all the decorative laminate assemblies prepared in this present Example 2. The print papers were either treated with the neat dicyandiamide modified melamine (MF) resin, corresponding to Sample 3 of the previous Example 1, or a proprietary melamine-formaldehyde/urea-formaldehyde (MF/UF) resin blend supplied by Duynea Overlays, Inc. of Tacoma, Wash. The Eastman Chemical Company 0.020 inch thick Eastar PETG Copolyester 6763 was used exclusively for all the decorative laminate assemblies of the present example, wherein the plasticized melamine resin treated overlay, treated print deco paper, and PETG core laminate portion were bonded to a filled PVC composite, or alternatively a cement fiberboard, substrate in a single pressing operation.

A nominal 4 ft.×12 ft. press pack was assembled on a carrier tray with the following materials in ascending superimposed relationship: 4 plies of 115 pound/ream untreated kraft "cushion", one decorative laminate assembly facing up (with the texturing paper and surface material on the top, a stainless steel press plate (AISI 410 SS with a smooth finish on both sides), a decorative laminate assembly facing down (with the texturing paper against the press plate, 4 plies of 115 pound/ream cushion, a decorative laminate assembly facing up, another stainless steel press plate, a decorative laminate assembly facing down, and finally 4 plies of 115 pound/ream cushion on top, wherein each decorative laminate assembly consisted of, in ascending superimposed relationship (for the assemblies facing up, and reversed for those facing down), 1 ply of BOPP film, a 3/32 inch thick PVC composite board, 1 sheet of PETG (with its protective film removed from both sides), 1 ply of treated print (printed side facing up), 1 ply of treated overlay (with the abrasive rich side facing down towards the print), and 1 ply of LC-28 texturing paper (from Ivex Inc., release side facing the overlay). As such, the press pack was comprised of two press plates and four decorative laminate assemblies (two outside singlets and one inside doublet). The internal cushion, between the center decorative laminate assemblies, was found to effectively separate the two sheets of otherwise adjacent filled vinyl sheets (except for two thin plies of BOPP film), which tend to behave as one thick sheet, and substantially reduces the tendency for the vinyl to creep and exude during the pressing operation.

The use of BOPP film as the separator between the filled PVC vinyl sheets and the cushion, rather than commercially available release or separator paper, is preferred, since there is no possibility of contamination of the exposed back of the vinyl sheet with a release agent such as wax or silicone, which could interfere with subsequent bonding the decorative laminate assembly to a subfloor. It will be recognized by those skilled in the art that other press back configurations might be used advantageously, as can other types of press plates, as discussed previously. Several press packs were so assembled.

The press packs thus prepared were then loaded into a conventional high pressure flat bed press, which was then closed and pressurized to 450–500 psig specific pressure. The press packs, so configured, were then heated to a laminate top cure temperature of 139° C., which was held for a period of time before rapidly cooling the laminates to less than 40° C. It took 25 minutes to heat the outside laminates to 139° C., which was held for 12 minutes prior to cooling, and took 21 minutes to reach 40° C. Concurrently, it took 26 minutes for the inside laminates to reach 138C, and an additional 6 minutes for them to reach 139° C., which was held for 5 minutes prior to cooling, and took 29 minutes to reach 40° C., at which point the pressure was released, the press opened and the press packs removed. Total thermal cycle time was 66 minutes, governed by heat transfer to the center laminates in the press packs. Under the above pressure and top temperature conditions, exudation of the PETG and vinyl were minimal, with 0–2 mm maximum edge "flash".

It should again be stressed that it is critical to control the press pack temperature and pressure, as described above, for the grades of PETG and filled vinyl sheet materials employed, to achieve the desired results of adequate softening and bonding of the PETG to both the melamine surface and vinyl core, without excessive flow and squeezing out of the PETG, and particularly the vinyl sheet. It was found that not exceeding 140° C. top temperature (time at top temperature is not critical, other than as it affects the cure of the melamine resin impregnated surface components), and 500 psig specific pressure, are optimum processing conditions for the materials selected. The higher press cycle top temperature employed herein, versus that used in the previous Example 1, which allows for greater cure of the melmine resin surface, is made possible by the lower pressure, which in turn is required to control compression and/or exudation of the filled vinyl sheet substrate. Use of other PETG or filled PVC vinyl sheet grades may require different temperature and pressure conditions for optimum results.

The stainless steel press plates were subsequently removed sequentially from the press packs for reuse, and the decorative laminate assemblies recovered. Their edges were then trimmed without any back sanding. The resultant decorative laminate assemblies thus obtained were about 1/8 inch thick. Those with granite-like stone print sheets were cut into 15 inch by 15 inch square tiles, while those with a woodgrain design were cut into 5 inch by 48 inch planks, for test floor installations.

Comparative impact resistance and 50° C. water soak resistance of the decorative laminate assembly flooring made in accordance with the preferred embodiments of Example 1 (Sample 4), and the preferred embodiments of this example of the present invention, in terms of revised processing conditions as recited above, was conducted in the same manner as in Example 1 (with the flooring bonded directly to a concrete slab for the impact resistance test), with the following results as shown in Table IV below:

TABLE IV

| Substrate: | Vinyl Sheet A | | Vinyl Sheet B* | | Cement Fiberboard | |
|---|---|---|---|---|---|---|
| % Ash (3 hours @ 760° C.) | 52.1 | | 60.2 | | N/A | |
| Print Resin Type: | MF | MF/UF | MF | MF/UF | MF | MF/UF |
| Impact Resistance (inches): | | | | | | |
| Example 1 Sample 4 | — | — | 40–60* | — | — | — |
| Example 2 | 25 | — | 45** | — | — | — |
| Water Soak | | | | | | |
| (days @ 50° C. to failure) | | | | | | |
| Granite Print | >7 | — | >7 | — | >7 | — |
| Woodgrain Print | — | 1 | — | 1 | — | 1 |

*Example 1 Sample 4 preferred embodiment with print as well as overlay treated with Cymel 385 and PEG 600 plasticized melamine resin.
**Example 2 comparative decorative laminate assembly construction, but with print treated with neat dicyandiamide modified melamine resin without additional internal and external plasticizers.

The above data illustrates important preferred embodiments of the present invention The flooring appears to have significantly better impact resistance (20 inches) with a more highly filled PVC vinyl composite sheet, and such a sheet is therefore preferred in the practice of the present invention. Additionally, a non-urea modified melamine resin for print sheet (as well as the overlay sheet) is preferred in the practice of the present invention to obtain the best water and moisture resistance for the flooring so produced.

It should be noted that although a single-step pressing operation is preferred when directly bonding the PETG layer to the substrate layer and melamine resin/paper surface, it is within the scope of the invention that a multi-step pressing operation can be used. For instance, a high pressure laminate comprising an overlay sheet, decorative sheet and a PETG core could first be assembled and pressed as a first step, and then, as a second step, the substrate could be directly bonded to this assembly through a second pressing operation. Also, as noted previously, although it is preferred that the substrate is directly bonded to the PETG core layer, an adhesive could be used to bond the substrate to the PETG core layer, as described in detail in Example 1 above.

While the preferred embodiments of this invention use a high pressure, multi-opening, flat bed hydraulic press to produce either a PETG core high pressure decorative laminate for subsequent bonding to a preferred substrate, or alternatively, a decorative laminate assembly in which the decorative surface components, PETG core and a preferred substrate are all bonded directly together in a single pressing step, it should be recognized that other laminating processes are applicable in the practice of this invention. Specifically, the PETG core decorative laminate component of the present invention, intended for subsequent bonding by means of an adhesive to a suitable substrate, can be produced with a low pressure, short cycle pressing process if cure compatible melamine resin treated surface materials are employed, and if a suitable separator material such as BOPP film and carrier tray mechanism are also provided. It is further envisioned that the entire decorative laminate assembly might be produced by such a process in a single operation, where in superimposed ascending relationship on a suitable carrier tray are placed BOPP, a suitable substrate such as a PVC sheet, a sheet of PETG, and the decorative print and overlay components, which are all feed simultaneously into the press, with subsequent hot discharge. In either case, the decorative melamine surface could either release directly from the fixed top press plate (typically chemically etched or shot peened 410 stainless steel), or alternatively, a separate texturing/release sheet could be employed if so desired for aesthetic reasons, albeit at additional effort and expense.

Additionally, as another embodiment of the present invention, a continuous double-belt pressing process might be utilized advantageously to produce the decorative laminate component in sheet or roll form, where, in superimposed descending relationship, continuous webs of texturing/release paper (optional), overlay, decorative print paper, one or more continuous films of PETG and a suitable separator material such as BOPP are fed into the press. The continuous laminate, upon exiting the press after consolidation and curing has taken place, is quickly cooled by means of cooling drums, with edge trimming and optional sheeting thereafter. The sheeted laminate so produced could then be bonded, by means of an adhesive, to a suitable substrate using a conventional cold or hot pressing process, where cold pressing can include just simply letting the glued assemblies cure in a stack in lieu of actually using a low pressure press. Conversely, a continuous web of continuous decorative laminate could off-line, from roll form, be fed into a second double-belt continuous press, along with discrete sheets of a suitable substrate pre-primed with an adhesive on its upper face, e.g. fed from a continuous glue spreader, along with a continuous film of a separator material such as BOPP underneath (which could subsequently be rewound and reused). Preferably, such a second continuous press, used for the bonding operation, could be in-line with the first "laminating" press, resulting in a quasi one-step process. Finally, it is also envisioned that the entire decorative laminate assembly might be produced in a single continuous press, in a single "glueless" process, which would reduce equipment cost and simplify the process considerably. In such a process, in superimposed descending relationship, continuous webs of texturing/release paper (optional), overlay, decorative print paper, one or more continuous films of PETG, discrete sheets of a preferred substrate, and with a suitable separator material such as BOPP film on the bottom, are fed into the press. Upon exiting the press, the continuous "chain" of decorative laminate assembly panels thus formed would first be edge trimmed, then the sheets separated by means of an indexing cross-cut knife, rotary shear or saw, and the discrete panels finally end trimmed and stacked. In such a process the need for BOPP separator to protect the bottom belt from contamination might be obviated if only the top belt is heated to cure the melamine surface and melt the PETG, and the bottom belt is kept cool (or even chilled to prevent radiant heating from the top belt), since in this proposed process, the PVC will not soften and transfer to the bottom belt, and there is no adhesive involved which could potentially drip on the belt.

In addition, as another embodiment of the present invention, depending on the nature and properties of the substrate used and its thickness, the flooring tiles and planks so produced could be provided with a tongue and groove, or other integral, edge treatment, or be otherwise prepared to accept a separate mechanical locking device, as a joinery system. Further, it should also be recognized that while the preferred embodiments of this invention are directed primarily to flooring applications, and particularly wet area or fire-rated flooring applications, the articles so produced are also useful for more mundane flooring applications, as well as other applications where decorative laminate panel assemblies find use and are desirable.

The foregoing description of a preferred embodiment of the invention has been presented for purposes of illustration and description, and is not intended to be exhaustive or to limit the invention to the precise form disclosed. The description was selected to best explain the principles of the invention and their practical application, to enable others skilled in the art to best utilize the invention in various embodiments and various modifications as are suited to the particular use contemplated. It is intended that the scope of the invention not be limited by the specification, but be defined by the claims set forth below.

We claim:

1. A decorative laminate assembly comprising:
   (a) a decorative laminate top layer comprising:
      (i) a decorative layer comprising a thermosetting resin impregnated cellulosic material, (ii) a core layer below said decorative layer comprising polyethylene terephthalate glycol; and (b) a substrate directly bonded to said decorative laminate top layer assembly.

2. The decorative laminate of claim 1, wherein said decorative laminate is a high pressure decorative laminate.

3. The decorative laminate of claim 1, wherein said decorative laminate is a low pressure decorative laminate.

4. The decorative laminate of claim 1, wherein said decorative laminate is continuous laminate.

5. The decorative laminate of claim 1, wherein said polyethylene terephthalate glycol comprises at least one sheet of polyethylene terephthalate glycol.

6. The decorative laminate of claim 1, wherein said core layer further comprises at least one layer of a woven or non-woven sheet formed from a material selected from the group consisting of glass, carbon and polymeric fiber.

7. The decorative laminate of claim 6, wherein said at least one layer is sandwiched in between two polyethylene terephthalate glycol sheets.

8. The decorative laminate of claim 1, wherein said decorative laminate further comprises an overlay layer on top of said decorative layer.

9. The decorative laminate of claim 8, wherein said overlay layer includes abrasive particles.

10. The decorative laminate assembly of claim 1, wherein said substrate is water resistant.

11. The decorative laminate assembly of claim 10, wherein said water resistant substrate comprises polyvinyl chloride.

12. The decorative laminate assembly of claim 10, wherein said water resistant substrate comprises fiber reinforced cement board.

13. A decorative laminate assembly comprising:
(a) a decorative laminate top layer comprising:
(i) a wear resistant layer;
(ii) a decorative layer comprising a thermosetting resin impregnated cellulosic material; and
(iii) a core layer below said decorative layer comprising polyethylene terephthalate glycol;
(b) a water resistant substrate, wherein said water resistant substrate is directly bonded to said core layer.

14. The decorative laminate of claim 13, wherein said decorative laminate is a high pressure decorative laminate.

15. The decorative laminate of claim 13, wherein said decorative laminate is a low pressure decorative laminate.

16. The decorative laminate of claim 13, wherein said decorative laminate is continuous laminate.

17. The decorative laminate of claim 13, wherein said polyethylene terephthalate glycol comprises at least one sheet of polyethylene terephthalate glycol.

18. The decorative laminate of claim 13, wherein said wear resistant layer is an overlay layer on top of said decorative layer, said overlay layer including abrasive particles.

19. The decorative laminate assembly of claim 13, wherein said water resistant substrate comprises polyvinyl chloride.

20. The decorative laminate assembly of claim 13, wherein said water resistant substrate comprises fiber reinforced cement board.

21. The decorative laminate of claim 13, wherein said core layer further comprises at least one layer of a woven or non-woven sheet formed from a material selected from the group consisting of glass, carbon and polymeric fiber.

22. The decorative laminate assembly of claim 21, wherein said at least one layer is sandwiched in between two polyethylene terephthalate glycol sheets.

23. A decorative laminate assembly comprising:
(a) a decorative laminate top layer comprising:
(i) a decorative layer comprising a thermosetting resin impregnated cellulosic material,
(ii) a core layer below said decorative layer comprising a polymeric material; and
(b) a substrate bonded to said decorative laminate top layer assembly.

24. The decorative laminate of claim 23, wherein said decorative laminate is a high pressure decorative laminate.

25. The decorative laminate of claim 23, wherein said decorative laminate is a low pressure decorative laminate.

26. The decorative laminate of claim 23, wherein said decorative laminate is continuous laminate.

27. The decorative laminate of claim 23, wherein said polymeric material comprises polyethylene terephthalate glycol.

28. The decorative laminate of claim 23, wherein said polymeric material comprises polycyclohexanedimethyl terephthalate glycol.

29. The decorative laminate of claim 23, wherein said substrate is directly bonded to said top layer assembly.

30. The decorative laminate of claim 23, wherein said decorative laminate further comprises an overlay layer on top of said decorative layer.

31. The decorative laminate of claim 30, wherein said overlay layer includes abrasive particles.

32. The decorative laminate assembly of claim 23, wherein said substrate is water resistant.

33. The decorative laminate assembly of claim 32, wherein said water resistant substrate comprises polyvinyl chloride.

34. The decorative laminate assembly of claim 32, wherein said water resistant substrate comprises fiber reinforced cement board.

35. A decorative laminate assembly comprising:
a decorative layer comprising a thermosetting resin impregnated cellulosic material,
a core layer below said decorative layer comprising a polymeric material.

36. The decorative laminate of claim 35, further comprising a substrate attached to said core layer, wherein said substrate comprises polyvinyl chloride.

37. The decorative laminate of claim 36, wherein said substrate comprises a first polyvinyl chloride sheet.

38. The decorative laminate of claim 37, wherein said substrate further comprises a second polyvinyl chloride sheet bonded to said first polyvinyl chloride sheet.

39. The decorative laminate of claim 38, wherein said first and second polyvinyl chloride sheets comprise a filled polyvinyl chloride.

40. The decorative laminate of claim 39, wherein said second polyvinyl sheet is less filled than the first polyvinyl sheet.

41. The decorative laminate of claim 38, wherein said second polyvinyl chloride sheet is bonded to said first polyvinyl chloride sheet with an adhesive.

42. The decorative laminate of claim 36, wherein said substrate is directly bonded to said decorative laminate top layer assembly.

43. The decorative laminate of claim 35, wherein said polymeric material comprises polyethylene terephthalate glycol.

44. The decorative laminate of claim 35, wherein said polymeric material comprises polycyclohexanedimethyl terephthalate glycol.

* * * * *